United States Patent
Meissner et al.

(10) Patent No.: US 6,224,746 B1
(45) Date of Patent: May 1, 2001

(54) METHOD AND DEVICE FOR TESTING THE QUALITY OF A SHEET-LIKE ELEMENT COMPRISING A MEMBRANE

(75) Inventors: Dieter Meissner, Jülich; Hermann Kabs, Nürnberg, both of (DE)

(73) Assignee: Forschungszentrum Jülich GmbH, Jülich (DE)

( * ) Notice: Subject to any disclaimer, the term of this patent is extended or adjusted under 35 U.S.C. 154(b) by 0 days.

(21) Appl. No.: 09/228,392

(22) Filed: Jan. 12, 1999

(30) Foreign Application Priority Data

Jan. 15, 1998 (DE) .............................. 198 01 117

(51) Int. Cl.⁷ .......................... B01D 65/10; G01M 19/00
(52) U.S. Cl. ...................... 205/791.5; 205/775; 204/401; 324/514; 73/38; 429/30
(58) Field of Search ................ 324/512, 513, 324/514, 522, 537; 73/38, 64.47; 429/90; 204/400, 401; 205/775, 791.5

(56) References Cited

U.S. PATENT DOCUMENTS

| | | | |
|---|---|---|---|
| 5,118,398 | * | 6/1992 | McElroy et al. ............... 204/410 |
| 5,361,625 | * | 11/1994 | Ylvisaker ....................... 73/38 |
| 5,591,636 | * | 1/1997 | Grass ........................... 435/287.1 |
| 5,599,688 | * | 2/1997 | Grass ........................... 435/29 |
| 5,763,765 | * | 6/1998 | Lamont et al. ................ 73/40 |
| 5,916,705 | * | 6/1999 | Carter et al. ................. 429/90 |
| 6,009,743 | * | 1/2000 | Mayer .......................... 73/38 |

* cited by examiner

Primary Examiner—Robert J. Warden, Sr.
Assistant Examiner—Kaj K. Olsen
(74) Attorney, Agent, or Firm—Nath & Associates PLLC; Gary M. Nath; Harold L. Novick

(57) ABSTRACT

A method and device for testing the quality of a sheet-like element comprising a membrane are presented. The quality test is limited to a part-area of the sheet-like element. A useful material is fed to one side of the sheet-like element via an outlet orifice corresponding to the part are to be tested. The method can be used in the production of large-area membranes or membrane/electrode units (MEU) provided for use in fuel cells. The quality test can take place in a simple way even during production of these sheet-like elements. Faults during production can be detected at an early stage and the production parameters changed accordingly. In the case of testing an MEU for a fuel cell, fuel gas can be applied to one side of the MEU in a punctiform manner. Oxygen of the ambient atmosphere located on the other side can serve as an oxidation gas. While fuel gas is being applied, a voltage generated between the electrodes of the MEU or the current flowing between the electrodes can be measured in order to check the quality of the MEU.

7 Claims, 2 Drawing Sheets

METHOD AND DEVICE FOR TESTING THE QUALITY OF A SHEET-LIKE ELEMENT COMPRISING A MEMBRANE

BACKGROUND OF THE INVENTION

The invention relates to a method and a device for testing the quality of a sheet-like element comprising a membrane.

DESCRIPTION OF THE RELATED ART

A sheet-like element of this type may be, for example, a membrane in itself or else a unit which has further elements in addition to a membrane. One example of such a unit is a membrane/electrode unit (MEU), such as is used in fuel cells. Such an MEU consists of an ion-conductive membrane which is provided with a catalytically active anode on one side and with a catalytically active cathode on the opposite side. In the case of low-temperature fuel cells, polymer electrolyte membranes are used, in which protons are split off from a fuel gas at the anode, the said protons passing through the membrane to the cathode and reacting there with the oxidation gas, whilst at the same time absorbing electrons. In the case of high-temperature fuel cells, ceramic oxide membranes are used, which consist of yttrium-stabilized zirconium oxide and are $O^{2-}$-conductors. DE-PS 4 241 150 discloses methods by which membrane/electrode units can be produced.

It is economically advantageous to produce sheet-like elements comprising a membrane, in the form of large-area initial material, from which individual elements can then be produced in the sizes necessary for the particular actual use.

Separate methods for testing the quality of, in particular, large-area elements are not known at the present time. Operability is checked, as a rule, when the sheet-like element is installed in the suitable size at its intended location, for example in the fuel cell. The disadvantage of this is that faulty sheet-like elements have to be replaced in a time-consuming manner. Moreover, systematic faults in production are detected only at a late stage.

SUMMARY OF THE INVENTION

The object of the present invention is to provide a method and a device of the type mentioned in the introduction, which do not have the disadvantages mentioned above.

In a method of the type mentioned in the introduction, the object is achieved in that the quality test is limited to a part area of the sheet-like element, in that a useful material, provided for the use of the sheet-like element, is fed to one side of the sheet-like element via a useful-material outlet orifice of a housing, the area bounded by the useful-material outlet orifice corresponding to the part area to be tested.

It thereby becomes possible to carry out the quality test on large-area elements. The test may take place randomly, in that the housing is placed onto individual part areas of the sheet-like element. The test may, however, also be carried out with full area coverage, in that a grid of part areas which covers the entire area is predetermined. The method is extremely simple and can therefore also be carried out cost-effectively by placing the housing onto the sheet-like element and feeding it with the useful material. Depending on the function of the sheet-like element, its effectiveness can then be established by means of suitable measures. For the quality check, the transition between the housing and the sheet-like element does not, as a rule, have to be sealed off in a special way. Of course, if hazardous and/or liquid useful materials are used, a sealing-off may be carried out, for example by the useful-material outlet orifice being bounded by means of a flexible material.

The method according to the invention may advantageously also be designed in such a way that the quality test is carried out during the production of the sheet-like element.

It follows directly from this that the method according to the invention may also be designed in such a way that the results of the quality test are used for the control of production parameters. In this way, faults in the production of the sheet-like element can be detected quickly and the production parameters adapted in order to improve the product.

Furthermore, it may be advantageous to design the method according to the invention in such a way that the sheet-like element is moved relative to the housing during the quality test. This is advantageous particularly when the sheet-like element is produced in the form of band material. The sheet-like element can then run past the housing, so that a continuous strip of the band material is checked by means of the housing and the housing does not have to be moved for this purpose.

If the sheet-like element comprises a membrane permeable to material, the method according to the invention may also be designed in such a way that the permeability of the membrane to the useful material is tested, the quantity of useful material which passes through the membrane in the region of the part area per unit time being detected on the other side of the sheet-like element.

It may be advantageous, in particular, to design the method according to the invention in such a way that the sheet-like element is a membrane/electrode unit (MEU) suitable for use in fuel cells and having electrode elements on both sides of the membrane, the useful material is a fuel gas fed to the housing at a specific partial pressure, the other side of the MEU is supplied with oxidation gas of a specific partial pressure and an electrical voltage generated between the electrode elements of the two sides of the MEU and/or an electrical current flowing between the electrode elements is measured.

In the case of a fuel cell which is operated with hydrogen and oxygen, atmospheric oxygen may be used as the oxidation gas. That is to say, it is sufficient merely to feed the fuel gas via a housing in a controlled manner, whilst the supply of oxidation gas on the other side of the MEU is ensured by the ambient atmosphere.

The method according to the invention may, however, also be designed in such a way that oxidation gas is fed to the other side of the MEU, opposite the useful-material outlet orifice, via an oxidation-gas outlet orifice of an oxidation-gas housing, the oxidation-gas outlet orifice corresponding in its dimensions to the useful-material outlet orifice. The partial pressure of the oxidation gas can thereby be checked effectively and, if appropriate, varied in a controlled manner.

The abovementioned object is achieved by means of a device comprising a housing with a plane useful-material outlet orifice and with a useful-material inlet orifice, a useful-material source and a useful-material conduit connecting the useful-material source to the useful-material inlet orifice.

It may be advantageous to design the device according to the invention in such a way that, in the case of a gaseous useful material, means for regulating and means for determining the useful-material partial pressure prevailing in the housing are provided.

In the case of a sheet-like element with a membrane permeable to material, the device according to the invention may be designed in such a way that, in order to test the permeability of the membrane to the useful material, means for detecting the quantity of useful material which passes through the membrane per unit time are provided.

Furthermore, it may be advantageous to design the device according to the invention in such a way that, in order to test a membrane/electrode unit (MEU) suitable for use in fuel cells and having electrode elements on both sides of the membrane, at least one anode contact element and at least one cathode contact element for electrical contacting with the electrode elements and means for determining a voltage prevailing between the electrode elements of the two sides and/or a current flowing between the electrode elements are provided.

If the electrode elements on the two sides of the MEU are sheet-like, simple wire-shaped elements, which rest resiliently on the MEU, are sufficient for the voltage pick-up.

The device according to the invention may advantageously be designed in such a way that the anode contact element located in the housing is designed as a drum-shaped hollow body and is mounted rotatably, the hollow body is permeable to fuel gas at least on its circumference provided for contacting with the MEU and the housing serving for the feed of fuel gas is arranged within the drum-shaped hollow body. A drum-shaped anode contact element is suitable particularly when the electrode elements are applied to the membrane in a punctiform manner and the anode contact element must therefore have an extensive contact area in order to ensure constant electrical contact. The rotatability of the hollow drum is advantageous particularly when the MEU is moved relative to the housing during the quality test. The friction occurring between the anode contact element and the MEU is thereby kept extremely low. The hollow body may consist, for example, of a porous graphite material or of a carbon felt. The fuel-gas stream may be led through the drum.

Reliable evidence of quality is possible only for the locations on the MEU at which it is subjected to fuel gas. The local distribution of the permeability of the hollow body to fuel gas thus influences which part area or part areas of the MEU is or are tested. If the hollow body has constant porosity on its circumference provided for contacting with the MEU, the areas of the MEU which are contacted by the hollow body are also subjected to fuel gas and are thus tested. If the hollow body is permeable only in places, for example because it has a continuous slot or differently shaped orifices, the testable part area may be predetermined by the boundary of these orifices if the fuel gas is fed solely via the housing located inside the hollow body.

Furthermore, the device according to the invention may also be designed in such a way that the anode contact element is designed as a drum-shaped hollow body and is mounted rotatably, the hollow body is permeable to fuel gas at least on its circumference provided for contacting with the MEU and the anode contact element is arranged within the housing serving for the feed of fuel gas. In this case, too, the fuel gas may be fed through the interior of the hollow body, for example via outlet orifices along the rotary shaft of the latter.

Advantageous embodiments of the method according to the invention and advantageous embodiments of the device according to the invention are illustrated below by means of figures.

DETAILED DESCRIPTION OF THE INVENTION

Figure 1:
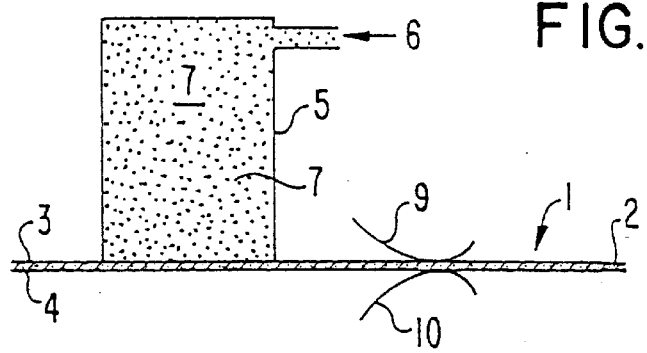
FIG. 1 shows a fuel-gas housing placed onto an MEU, and two contact elements.

FIG. 1 shows a membrane/electrode unit (MEU) 1, consisting of a proton-permeable membrane 2 equipped on both sides with electrode elements which form the anode 3 on the top side and the cathode 4 on the other side. Located above the MEU 1 is a fuel-gas housing 5 with a fuel-gas inlet orifice 6, through which a fuel gas 7, illustrated by dots, may be introduced via a feed conduit not illustrated here.

Figure 2:
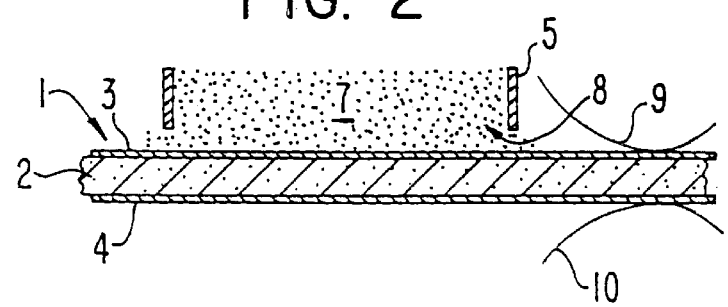
FIG. 2 shows part of the arrangement according to FIG. 1 in an enlarged illustration.

FIG. 2 shows an enlarged detail of the arrangement from FIG. 1. It can be seen that the fuel-gas outlet orifice 8 does not rest directly on the MEU 1 and therefore the fuel-gas housing 5 is not sealed off relative to the ambient atmosphere. Sealing-off measures are not necessary as long as the fuel-gas concentration in the ambient atmosphere is within non-critical values. In the arrangements according to FIG. 1 and FIG. 2, the atmospheric oxygen is used as the oxidation gas. The voltage generated as a result of the reaction of fuel gas 7 and oxidation gas and prevailing between the anode 3 and cathode 4 is picked up by means of a wire-shaped anode contact element 9 and a likewise wire-shaped cathode contact element 10. Electrical leads, not illustrated, lead from the contact elements 9 and 10 to a voltage-measuring unit, likewise not illustrated.

Figure 3:
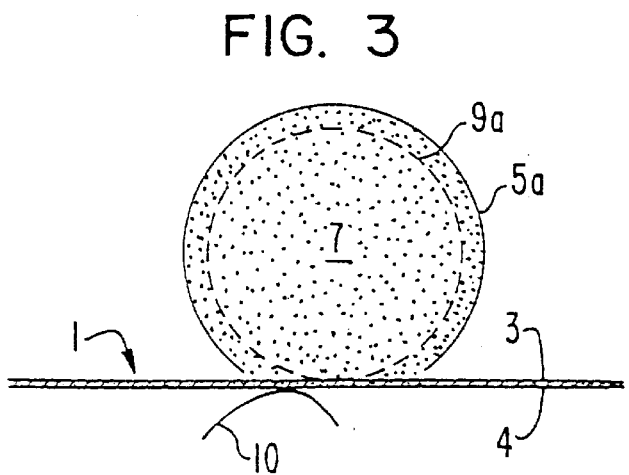
FIG. 3 shows a round fuel-gas housing placed onto the MEU, with a drum-shaped anode contact element and with a wire-shaped cathode contact element.

In FIG. 3, a round fuel-gas housing 5a, within which a drum-shaped anode contact element 9a is arranged, is located above the MEU 1. Furthermore, the cathode 4 is touched by the wire-shaped cathode contact element 10.

Figure 4:
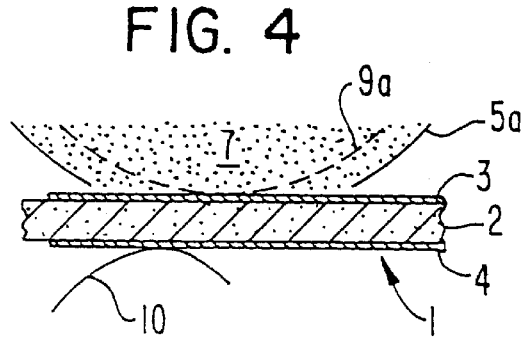
FIG. 4 shows a detail of the arrangement according to FIG. 3 in an enlarged illustration.

In the enlarged illustration in FIG. 4, it can be seen that the drum-shaped anode contact element 9a rests on the anode 3. The anode contact element 9a is mounted rotatably, so that, during relative movement between the MEU 1 and fuel-gas housing 5a, electrical contact between the anode contact element 9a and the anode 3 is maintained with low frictional forces. The drum-shaped anode contact element 9a is permeable to the fuel gas 7. The fuel gas 7 can therefore be introduced into the anode contact element 9a, for example via the interior of the rotary shaft of the anode contact element 9a.

Figure 5:
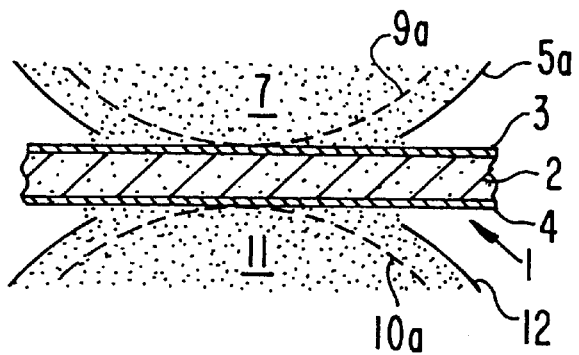
FIG. 5 shows a detail of an arrangement with a fuel-gas housing and with an oxidation-gas housing, in each case placed onto the MEU by means of a drum-shaped contact element.

FIG. 5 shows an arrangement, in which the oxidation gas 11, illustrated here by dots, is also fed via a cylindrical oxidation-gas housing 12. Here, in a similar way to the anode contact element 9, the cathode contact element 10a is designed to be drum-shaped and rotatable and is permeable to the oxidation gas 11.

Figure 6:
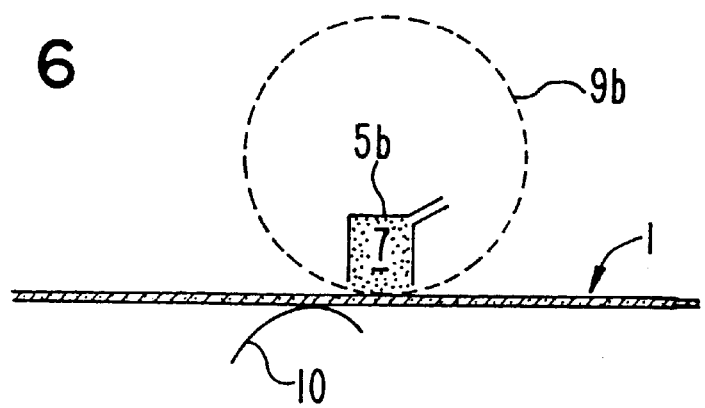
FIG. 6 shows an arrangement with a drum-shaped anode contact element placed onto the MEU and with a fuel-gas housing located inside the anode contact element.
Figure 7:
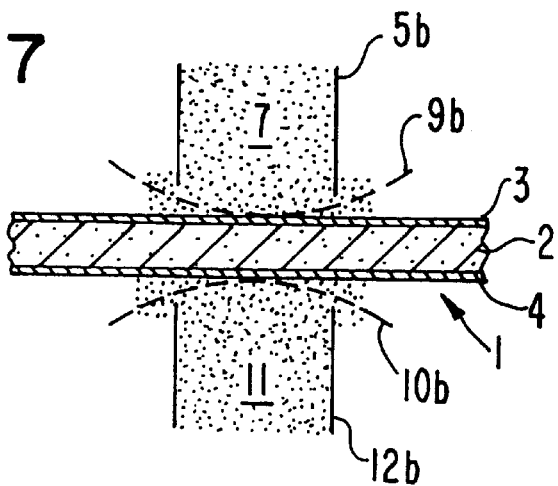
FIG. 7 shows a detail of an arrangement with two drum-shaped contact elements and with a fuel-gas housing and oxidation-gas housing located in it.

FIG. 6 shows an arrangement, in which a fuel-gas housing 5b is located within a drum-shaped anode contact element 9b. In the arrangement according to FIG. 7, the oxidation gas 11 is additionally fed via an oxidation-gas housing 12b located in the cathode contact element 10b.

LIST OF REFERENCE SYMBOLS

| | |
|---|---|
| 1 | Membrane/electrode unit |
| 2 | Membrane |
| 3 | Anode |
| 4 | Cathode |
| 5, 5a, 5b | Fuel-gas housing |
| 6 | Fuel-gas inlet orifice |
| 7 | Fuel gas |
| 8 | Fuel-gas outlet orifice |
| 9, 9a, 9b | Anode contact element |
| 10, 10a, 10b | Cathode contact element |
| 11 | Oxidation gas |
| 12, 12b | Oxidation-gas housing |

What is claimed is:

1. A method for testing a membrane/electrode unit (MEU) which comprises a membrane having a first side and an opposite second side, said MEU suitable for use in fuel cells and having electrode elements on said first and second sides of the membrane, the method comprising:

providing said membrane;

limiting said test to a part of an area of said membrane;

feeding a useful-material to said first side of said membrane via a useful-material outlet orifice of a housing, wherein an area bounded by the useful-material outlet orifice corresponds to said area part to be tested and wherein said useful-material is a fuel gas fed to the housing at a specific partial pressure;

providing an oxidation gas of a specific partial pressure to said second side of the MEU; and measuring an electrical voltage generated between said electrode elements on said first and second sides of the MEU and/or an electrical current flowing between the electrode elements.

2. The method according to claim 1, characterized in that said oxidation gas is fed to the second side of the MEU, opposite the useful-material outlet orifice, via an oxidation-gas outlet orifice of an oxidation-gas housing, the oxidation-gas outlet orifice corresponding in its dimensions to the useful-material outlet orifice.

3. A device for testing a sheet-like element comprising a membrane of a membrane/electrode unit (MEU) usable in fuel cells and having electrode elements on both sides of said membrane, said device comprising:

a housing having a useful-material outlet orifice and a useful-material inlet orifice;

a gaseous useful-material source that includes a fuel gas;

a useful-material conduit connecting the useful-material source to the useful-material inlet orifice;

means for regulating a useful-material partial pressure prevailing in said housing;

means for determining the useful-material partial pressure prevailing in said housing;

at least one anode contact element which can electrically contact at least one of said electrode elements and that includes a rotatably mounted drum-shaped hollow body, the hollow body is permeable to the fuel gas at least on its circumference provided for contacting with the MEU, and the housing serving for the feed of the fuel gas is arranged within the drum-shaped hollow body;

at least one cathode contact element which can electrically contact at least the other of said electrode elements; and means for determining a voltage between the electrode elements and/or a current flowing between the electrode elements.

4. A device for testing a sheet-like element comprising a membrane of a membrane/electrode unit (MEU) usable in fuel cells and having electrode elements on both sides of said membrane, said device comprising:

a housing having a useful-material outlet orifice and a useful-material inlet orifice;

a gaseous useful-material source that includes a fuel gas;

a useful-material conduit connecting the useful-material source to the useful-material inlet orifice;

means for regulating a useful-material partial pressure prevailing in said housing;

means for determining the useful-material partial pressure prevailing in said housing;

at least one anode contact element which can electrically contact at least one of said electrode elements and that includes a rotatably mounted drum-shaped hollow body, the hollow body is permeable to the fuel gas at least on its circumference provided for contacting with the MEU, and the anode contact element is arranged within the housing serving for the feed of fuel gas;

at least one cathode contact element which can electrically contact at least the other of said electrode elements; and means for determining a voltage between the electrode elements and/or a current flowing between the electrode elements.

5. A device for testing a sheet-like element comprising a membrane of a membrane/electrode unit (MEU) usable in fuel cells and having electrode elements on both sides of said membrane, said device comprising:

a housing having a useful-material outlet orifice and a useful-material inlet orifice;

a gaseous useful-material source;

a useful-material conduit connecting the useful-material source to the useful-material inlet orifice;

means for regulating a useful-material partial pressure prevailing in said housing;

means for determining the useful-material partial pressure prevailing in said housing;

at least one anode contact element which can electrically contact at least one of said electrode elements;

at least one cathode contact element which can electrically contact at least the other of said electrode elements; and means for determining a voltage between the electrode elements and/or a current flowing between the electrode elements;

an oxidation-gas housing with an oxidation-gas inlet orifice;

an oxidation-gas source;

an oxidation-gas conduit connecting the oxidation-gas source to the oxidation-gas inlet orifice; and means for regulating and means for determining a partial pressure of an oxidation-gas in the oxidation-gas housing.

6. The device according to claim 5, characterized in that:

the at least one cathode contact element is a drum-shaped hollow body rotatable relative to said MEU;

the hollow body is permeable to the oxidation gas at least on a portion of its circumferential surface provided for contacting with the MEU; and the oxidation-gas housing is disposed within the drum-shaped hollow body.

7. The device according to claim 5, characterized in that:

the at least one cathode contact element is a drum-shaped hollow body rotatable relative to said MEU;

the hollow body is permeable to the oxidation gas at least on a portion of its circumferential surface provided for contacting with the MEU; and the at least one cathode contact element is disposed within the oxidation-gas housing.

* * * * *